United States Patent

Kosaka

[15] 3,671,665

[45] June 20, 1972

[54] SIGNAL EDITING SYSTEM AND APPARATUS FOR RECORDING AND REPRODUCING APPARATUS

[72] Inventor: Yoshiteru Kosaka, Kamakura, Japan

[73] Assignee: Victor Company of Japan, Ltd., Yokohama, Kanagawta-ken, Japan

[22] Filed: June 30, 1970

[21] Appl. No.: 51,103

Related U.S. Application Data

[63] Continuation-in-part of Ser. No. 778,666, Nov. 25, 1968, Pat. No. 3,580,994.

[30] Foreign Application Priority Data

Nov. 27, 1967 Japan....................................42/75626
Nov. 27, 1967 Japan....................................42/75627
July 2, 1969 Japan....................................44/51743

[52] U.S. Cl.......................178/6.6 P, 178/6.6 P, 179/100.2 B

[51] Int. Cl....................G11b 5/04, G11b 27/02, H04n 5/78

[58] Field of Search......................178/6.6 A, 6.6 P, 100.2 B; 179/100.2 B

[56] References Cited

UNITED STATES PATENTS 3,542,949 11/1970 Tanaka et al....................179/100.2 B
3,342,932 9/1967 Bounsall..........................179/100.2 B

*Primary Examiner*—Bernard Konick
*Assistant Examiner*—Steven B. Pokotilow
*Attorney*—Louis Bernat

[57] ABSTRACT

A signal editing system edits and records a new signal on the way of an already recorded signal on a recording medium in a recording and reproducing apparatus. Editing and recording are started and ended respectively at the time when a control signal already recorded on the recording medium and a control signal responsive to the new recording signal become coincident each other at the starting and ending time of editing and recording.

3 Claims, 10 Drawing Figures

INVENTOR
YOSHITERU KOSAKA
BY Louis Bauer
ATTORNEY

INVENTOR
YOSHITERU KOSAKA
BY [signature]
ATTORNEY

PATENTED JUN 20 1972

3,671,665

INVENTOR
YOSHITERU KOSAKA

BY [signature]
ATTORNEY

INVENTOR
YOSHITERU KOSAKA
BY Louis Bernat
ATTORNEY

SIGNAL EDITING SYSTEM AND APPARATUS FOR RECORDING AND REPRODUCING APPARATUS

This application is a Continuation-In-Part application of the copending patent application Ser. No. 778666 "SIGNAL EDITING SYSTEM FOR MAGNETIC RECORDING AND REPRODUCING APPARATUS" filed on Nov. 25, 1968 by the same applicant, now U.S. Pat. No. 3,580,994.

The present invention relates to a signal editing system and apparatus, and more particularly to a system and apparatus for editing and recording new video signals on a recording medium, on which other signals are already recorded.

In a magnetic recording and reproducing apparatus, information corresponding to substantially one frame or one field of video signal is generally recorded alternately by two magnetic recording and reproducing heads acting on a magnetic tape. The tape is moved obliquely along the peripheral surface of a cylindrical guide drum for a distance of substantially more than half the circumference thereof. The magnetic recording and reproducing heads are mounted on the peripheral edge of a rotary disc, adapted to rotate in the center of the guide drum, and they are disposed at positions substantially diametrically opposed to each other. The information is magnetically recorded on the magnetic tape in the form of magnetic tracks, of substantial length, disposed obliquely with respect to the longitudinal axis of the tape. Each track contains the signals of substantially one field or one frame of video signals. To effect electronic editing of signals in such a magnetic recording and reproducing apparatus, a system is used in which another new signal is recorded by the aforementioned magnetic recording and reproducing heads. The new signal is recorded on a magnetic tape on which one signal is already recorded. This new recording is accomplished by erasing the already recorded signal by means of a magnetic erasing head mounted immediately before the drum on the supply reel side.

Editing is performed by recording another signal from a new signal source on a magnetic tape on which one signal is already recorded. This other signal may be recorded any time, as desired, by switching from the first signal to the other signal. To attain the end, it is essential that editing be effected in such a manner that no disturbance occurs in the reproduced pictures at a point on the tape at which switching from one signal to another is effected.

In a magnetic recording and reproducing apparatus, for recording and reproducing television video signals, for example, a normal picture image can be produced during recording by taking out a control signal from a vertical synchronizing signal contained in a video signal to be recorded. The control signal is used to generate a drive signal supplied to a motor for operating the rotary magnetic heads. This control signal is recorded near the upper edge or lower edge of the tape and reproduced when the recordings are reproduced. Thus the drive signal can be supplied to drive the aforementioned motor to cause the rotary magnetic heads to accurately trace the magnetic tracks recorded on the magnetic tape.

If the travelling velocity of the magnetic tape is constant, the pulse intervals of the control signal will be uniform. If the intervals of the pulses are not uniform, the rate of revolution of the magnetic recording and reproducing heads will not be constant, resulting in the occurrence of disturbance in synchronism of reproduced pictures. Thus, drifting will occur in the reproduced picture image.

Such a magnetic recording and reproducing apparatus is used to record a new signal on a magnetic tape on which a video signal having a synchronizing signal is already recorded. The new video signal has another synchronizing signal. The new recording may start at any point, as desired, while the first video signal is being reproduced. This new recording is made by switching from a reproduction mode to a recording mode, and the position of the synchronizing signal of the new video signal may deviate from the regular position. Synchronism may be disturbed, if the two synchronizing signals recorded on the magnetic tape are not properly aligned with respect to each other. More specifically, the spacing between the switching point and the position at which a first control signal is recorded, after switching is effected, may vary from the spacing between the subsequent positions at which the control signal is recorded. Also, the spacing between the magnetic tracks, recorded immediately after switching is effected, may vary from the spacing between the magnetic tracks subsequently recorded. If the recordings made on the magnetic tape in the manner as aforementioned is reproduced, rotation of the rotary magnetic heads will be disturbed at the switching point.

Therefore, in editing the video signal, the disturbances in synchronism which are likely to occur at the junction point of the previously recorded signal and the newly recorded signal have to be avoided. The avoidance of disturbances in synchronism is also required at the end of editing as well, as at the start of editing.

Generally, for the video signal editing system, there are two systems of the type as hereafter described. A first of these systems provides that the only video signal on the edited part is erased, out of the previously recorded signals. Then a new video signal is recorded on the above-mentioned erased part. It is noted that during erasing period, the control signal portion remains on the tape. The system of this type is called as an "instant editing system." Another type of the editing system enables a simultaneous erasing of the video signal and the control signal on the edited part. It is thus possible to record a new video signal and a new control signal on the erased part. The system of this latter type is called as an "assembly editing system."

According to the above-mentioned insert editing system, an erasing head is provided to erase only the video signal portion. Therefore, a full erase head for erasing simultaneously the entire width of the magnetic tape could not be used. Furthermore, this system needs a capstan servo circuit. Consequently, the magnetic recording and reproducing apparatus using the insert editing system becomes to complicated in the construction. Because of the complexity, the insert editing system could not effectively be applied in the magnetic video signal recording and reproducing apparatus (VTR), particularly one of a simple type.

On the other hand, in the assembly editing system, as mentioned above, the full erase head is employed for erasing the entire width of the magnetic tape. Accordingly, the VTR practising this system has an advantage of a very simple construction. However, in this system, the previously recorded signal and newly recording signal may have occasional phase errors with respect to each other, both at the start and at the end of editing. Therefore, this system often gives rise to problems of disturbance in synchronism, as described above. Thus, disturbances in the reproduced picture are produced.

Therefore, it is the general object of the present invention to provide a novel and useful editing system and apparatus for a recording and reproducing apparatus which can prevent the occurrence of disturbances in synchronism of signals at the time editing is effected.

Another object of the invention is to provide a system which permits fine editing and recording without causing phase errors between the previously recorded signal on a recording medium and the new signal to be edited and recorded thereon.

Still another object of the invention is to provide a system which can perform an editing and recording without causing phase error between the previously recorded signal and the newly recorded signal at the times when editing is started and ended.

A further object of the invention is to provide a system which can edit and record both new video signal and control signal without causing the phase error. Specifically, the system is intended to apply in the assembly editing system for erasing both a video signal and a control signal recorded on a magnetic tape with a full erase head during editing and for recording a new video signal and a new control signal thereon.

A further object of the invention is to provide a system which can compare phases of a reproduced control signal and a recording control signal, and vary the travelling speed of a recording medium to start or end the editing and recording when the phases of both signals are in coincidence.

A still further object of the invention is to provide an apparatus which can reproduce the previously recorded control signal during the editing and recording time as well as the reproducing time and which can apply the reproduced control signal for phase-coinciding at the end of editing and recording.

A still further object of the invention is to provide a signal editing system for magnetic recording and reproducing apparatus. The travelling velocity of the recording medium is varied when the synchronizing signals of two video signals, to be edited, vary from each other. Variation may be in phase and frequency. The travelling velocity of the recording medium varies so as to bring the synchronizing signals into agreement with each other in phase and frequency. Thus editing and recording can automatically be started the moment this agreement in phase and frequency is brought about.

Additional objects and advantages of the present invention will become apparent when the description set forth below is considered in conjunction with the accompanying drawings, in which.

Figure 1:
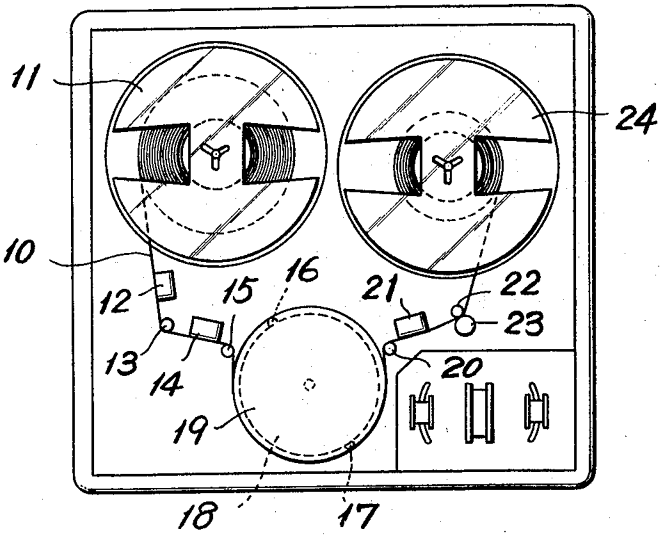
FIG. 1 is a plan view of an apparatus for magnetically recording and reproducing video signals in which the system according to this invention can be incorporated.

FIG. 1 shows an apparatus for magnetically recording and reproducing video signals in which the system according to this invention can apply. A magnetic tape 10 is unwound from a supply reel 11. First, it passes a first magnetic control head 12 for reproducing control signals and a first tape guide roller 13, and then is brought into contact with a magnetic erase head 14 and a second tape guide roller 15. The magnetic erase head 14 is a full erase head which can erase recorded signals on the magnetic tape 10 over the entire width of the tape. The tape is travelled obliquely along the peripheral surface of a guide drum 19 for a distance corresponding to substantially more than half the circumference thereof. Mounted inside the drum is a rotary magnetic head 18 consisting of pair of magnetic recording and reproducing heads 16 and 17 for recording and reproducing video signals. After leaving the drum, the tape 10 passes by a third tape guide roller 20, and then is brought into contact with a fixed magnetic recording and reproducing head block 21. The head block 21 comprises a magnetic audio head for recording and reproducing audio signals at the lower marginal portion of the tape and a second magnetic control head for recording and reproducing control signals at the upper marginal portion of the tape. The magnetic audio and control heads traces the marginal portions of the tape in the direction of movement of the tape. After passing the head block 21, the tape 10 is held between a capstan 22 and a pinch roller 23 to be moved in the direction of arrow Y at a predetermined constant velocity at all times. The capstan 22 is rotated by a capstan motor rotating at a constant number of revolutions determined by the constant frequency of a power source. The capstan motor is controlled its rotating velocity and rotating phase at the starting and the end of the editing. Finally, the tape is wound on a take-up reel 24.

Figures 4, 5:
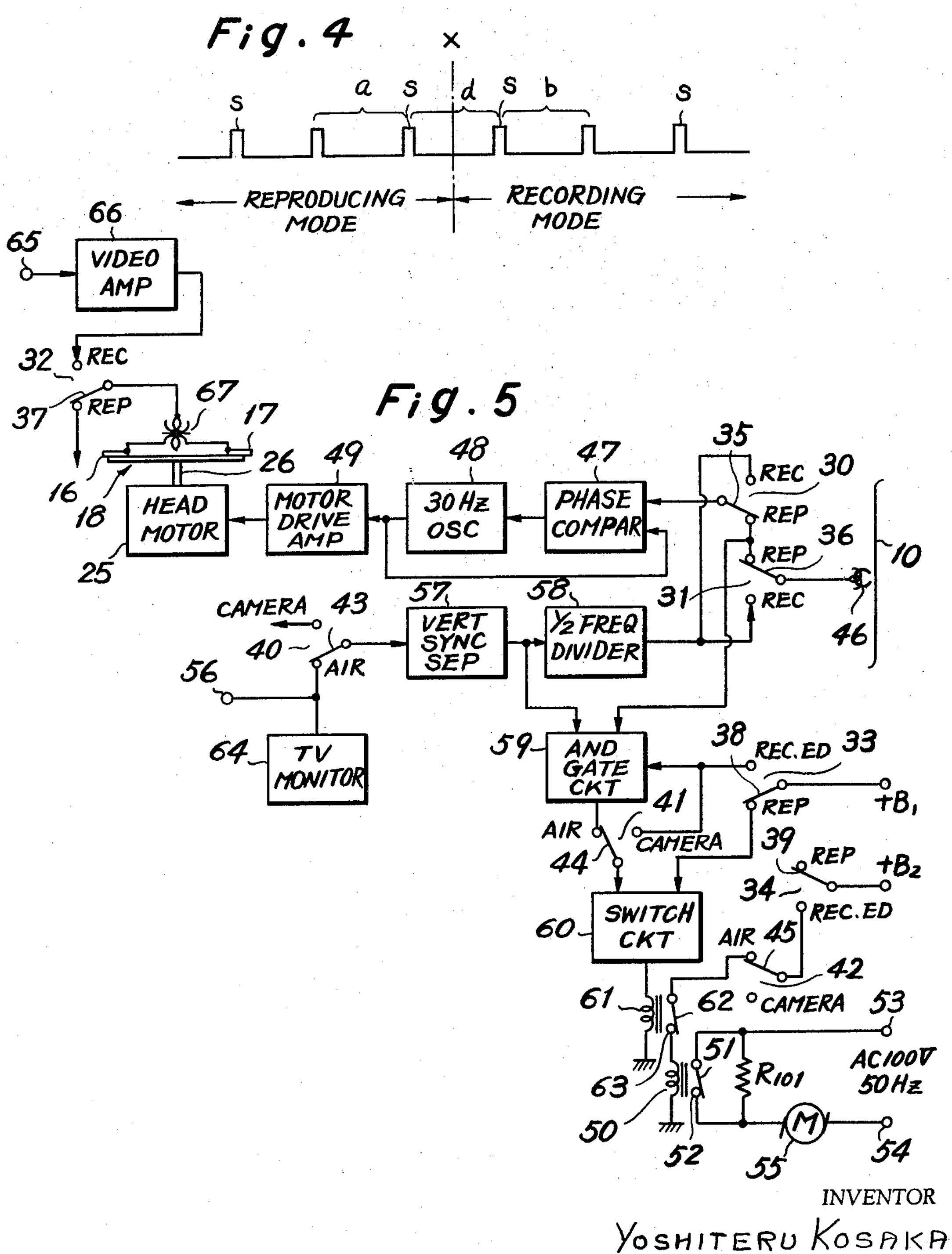
FIG. 4 is a graphical view showing the relationship of pulses of control signals in explanation of the system according to this invention.
FIG. 5 is a systematic block diagram showing one embodiment of the system according to this invention.
Figure 8:
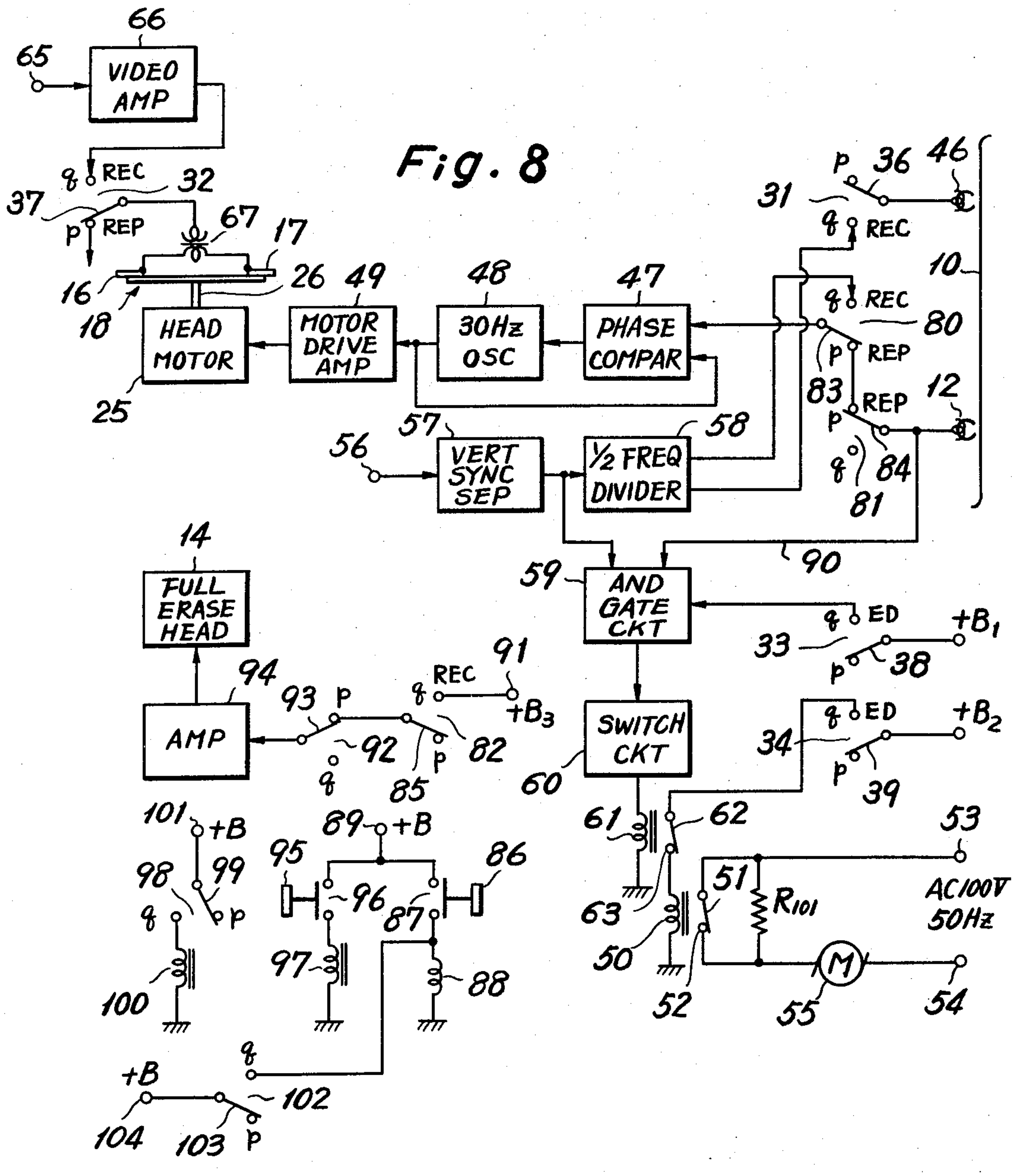
FIG. 8 is a systematic block diagram showing another embodiment of the system according to this invention.

The rotary magnetic head 18 consists of a pair of magnetic recording and reproducing heads 16 and 17 mounted at diametrically opposed positions on the peripheral edge of a rotary member. This member is rotatable in a plane normal to the center line of the guide drum 19. The drum and rotary member are coaxial with a rotary shaft 26 of a rotary magnetic head drive motor 25 and coincident with said rotary shaft as shown in FIGS. 1, 5 and 8.

Figures 2, 3:
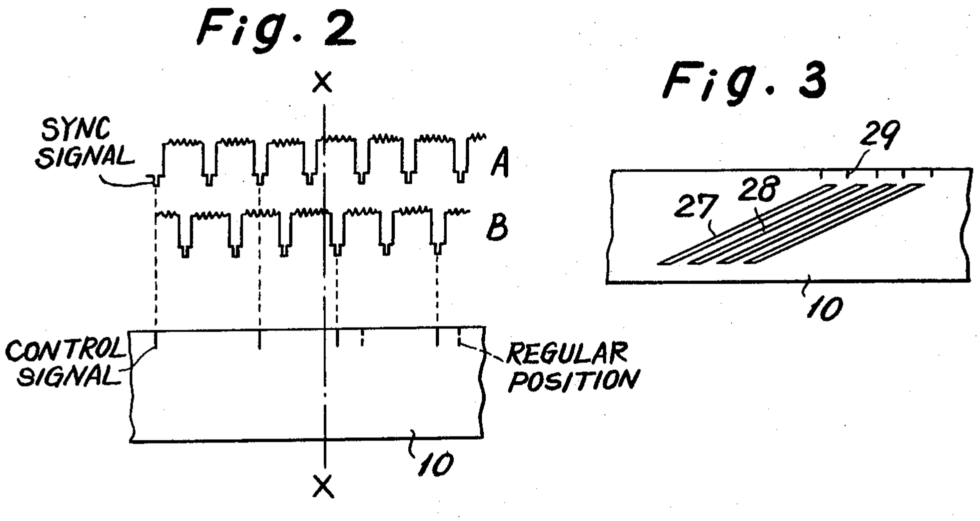
FIG. 2 is a graphical view showing the relationship between two signals to be edited and the positions of control signals on a magnetic tape.
FIG. 3 is a schematic view of a fragment of magnetic tape showing the magnetic tracks formed on the magnetic tape used with the apparatus of FIG. 1.

The magnetic tape 10 is moved along the peripheral surface of the guide drum, obliquely, with respect to the center line thereof. Hence, video signal tracks formed by the magnetic recording and reproducing heads 16 and 17 on the magnetic tape 10 are in the form of recorded tracks or lines 27 and 28 disposed obliquely with respect to the longitudinal axis of the magnetic tape 10 as shown in FIG. 3. In this embodiment, the rate of revolution of the rotary magnetic head 18 is selected such that information corresponding to slightly more than one field of video signal is recorded on each of the magnetic tracks 27 and 28. Therefore the same signal can, for example, be recorded at the upper end of magnetic track 27 and at the lower end of the magnetic track 28. It is to be understood that information corresponding to one frame of video signal, instead of one field thereof, can be recorded on each of the magnetic tracks.

As shown in FIG. 3, the vertical synchronizing signal of the recording video signal is recorded in the form of a control track 29 at the upper marginal portion of the tape. Alternatively, it could be recorded on the lower marginal portion of the magnetic tape. This is the control signal that is recorded and played back by the magnetic control head in the fixed magnetic recording and reproducing head block 21.

To edit a recording which has already been made on tape 10, another new signal may be recorded by starting at any point on the previously recorded tape, such as half-way through the recorded signal, for example. The new signal, for example, may be a video signal, frequency modulated and supplied to the magnetic recording and reproducing heads 16 and 17. An erasing high frequency current is supplied to the magnetic erase head 14, and simultaneously the new video signal is supplied to the magnetic recording and reproducing heads 16 and 17. The new video signal will then be recorded on the magnetic tape 10 by the magnetic heads 16 and 17 while the signal on the magnetic tracks already recorded on the magnetic tape 10 is erased by the magnetic erase head 14. To make an electronic editing of signal in this way, there is a requirement that has to be met, as set forth hereunder.

When the editing of new video signal starts at a random point X—X on the magnetic tape, it may be half-way through the recorded signal. In switching from a reproduction mode to a recording mode, as shown in FIG. 4, the spacing (a) should be equal to the spacing (b). Spacing (a) appears between the pulses (s) of the control signal of the reproduced video signal in the reproduction mode. Spacing (b) appears between the pulses (s) of the control signal of the recorded signal in the editing recording mode. The spacing (d) occurs between the last pulse (s) of the control signal in the reproduction mode and the first pulse (s) of the control signal in the recording mode. Spacing (d) should also be equal to the aforementioned spacing (a). That is, the requirement that has to be met in effecting editing satisfactorily is that the spacings (a) = (b) = (d).

Now, one embodiment of the system according to this invention will be explained with reference to FIG. 5. In FIG. 5, movable contact members 35, 36, 37, 38 and 39 of switches 30, 31, 32, 33 and 34 are moved into contact with fixed contact points REC thereof in a recording operation. These same movable contact members are moved into contact with fixed contact points REP thereof in a reproduction operation. There are shown switches 40, 41 and 42 having movable contact members 43, 44 and 45 respectively. When the movable contact members 43, 44 and 45 are moved into contact with fixed contact points CAMERA or AIR thereof, the tape player VTR can be switched and made ready for recording either a video signal from a television camera or an AIR signal by editing.

An editing operation for recording the on-air television video signals is now described hereinbelow. The movable contact members 43 – 45 of the switches 40 – 42 are moved into contact with the fixed contact points AIR thereof, and the movable contact members 35 – 39 of the switches 30 – 34 are moved into contact with the fixed contact points REP thereof for effecting normal reproduction of video signals and control signals already recorded on the magnetic tape.

The magnetic track of control signals on the magnetic tape 10 are traced by the fixed magnetic control signal recording and reproducing head 46 of the magnetic head block 21. The reproduced control signal is supplied, through the switches 31 and 30, to the phase comparator 47 to which is simultaneously supplied the 30 Hz output signal of the 30 Hz oscillator 48. The phases of two signals are compared with each other in phase at the phase comparator 47 whose output signal is supplied to the 30 Hz oscillator as a modulated input of the comparator 47. The 30 Hz output signal of the oscillator 48 is also supplied to the motor drive amplifier 49 where it is amplified and then used to drive the rotary magnetic head drive motor 25. The rotary magnetic head 18 is directly connected to the rotary shaft of the motor so that it can be rotated at a rate of 30 revolutions per second.

The rotary magnetic head drive motor 25 is a phase locking synchronous motor which has, as described in U.S. Pat. No. 3,385,926, a ferrite permanent magnet mounted on its rotor for rotation with its rotor as a unit. Therefore it is possible to drive the motor by an open loop servo system.

As the contact member 39 of the switch 34 connected to a power source of a voltage $+B_2$ is contacted with the contact point REP, the relay 50 is in a non-operative state. Consequently a movable contact member 51 and a fixed contact point 52 of the relay 50 are closed. This enables an AC voltage (AC 100 V, 50 Hz) from power source terminals 53 and 54 to be applied directly to a capstan motor 55 which drives the capstan 22. The capstan motor rotates at a constant rate to thereby travel the magnetic tape 10 at a predetermined velocity.

It is desired to record the AIR signal by editing on the magnetic tape on which a video signal is already recorded. Editing may begin by starting at any point, as desired, which may be half-way through the video signal already recorded on the tape. The movable contact members 38 and 39 of the switches 33 and 34 are moved into contact with fixed contact points REC, ED thereof. The movable contact members 35 and 36 of the switches 30 and 31 are maintained in contact with the fixed contact points REP thereof.

The AIR signal to be recorded by editing is supplied through an input terminal 56 and the switch 40, to the vertical synchronizing signal separator 57. At the same time the AIR signal is monitored by a TV monitor receiver 64.

The vertical synchronizing signal is separated from the rest of the AIR signal and supplied to the input of an AND gate circuit 59 which generates output signal pulses only when synchronizing signals of two different video signals coincide with each other in phase. The control signal is reproduced from the magnetic tape 10 by the magnetic control head 46 and supplied through the switch 31 to the AND gate circuit 59. If the vertical synchronizing signals and the reproduced control signals do not coincide in phase when they are supplied to the AND gate circuit 59, they are out of phase with each other, and no output signal is produced at the output of AND gate 59. The mode change-over switching circuit 60 remains switched to the reproduction mode, and a relay 61 is maintained in the off position.

A voltage $+B_1$ is supplied to the AND gate circuit 59 through the switch 33. As the relay 61 is maintained in the off position, the movable contact member 62 and the fixed contact point 63 are closed. A voltage $+B_2$ is supplied to the coil of relay 50 through the switches 34 and 42 and the contact 62 and the contact point 63. Accordingly, the relay 50 is operated by the voltage $+B_2$, so that the contact member 51 and the contact point 52 of the relay 50 are opened. Thus, a resistor $R_{101}$ and the capstan motor 55 are effectively connected in series with each other. This results in the capstan motor 55 rotating at a rate lower than the predetermined constant velocity of revolution in a normal reproduction mode. Accordingly, the travelling velocity of the magnetic tape 10 is reduced.

As the travelling velocity of the magnetic tape 10 is reduced, the phase of the synchronizing signal of the reproduced video signal on the magnetic tape is delayed. An output signal is generated by the AND gate circuit 59, when the reproduced synchronizing signal agrees in phase with the synchronizing signal of the video signal from outside. The AND gate output signal is transmitted through the switch 41 to the mode change-over switching circuit 60 which switches the tape player VTR from a reproduction mode to a recording mode. At the same time, the relay 61 operates. Therefore, the editing is started only when the control signal reproduced by the control head 46 coincides in phase with the synchronizing signal of the recording video signal.

Upon being switched to a recording mode, the tape player VTR begins to record the AIR signal. When the mode change-over switching circuit 60 is actuated, the contact members 35, 36 and 37 of the switches 30, 31 and 32 are changed to the contact point REC. The vertical synchronizing signal of 60 Hz from a vertical synchronizing signal separator 57 is divided into half of the original frequency by a ½ frequency divider 58. A pulse of 30 Hz from the divider 58 is passed to the control head 46 through the switch 31. The pulse is then recorded on the magnetic tape 10 as a control signal. On the other hand, the same broadcasting on-air signal as the signal applied in a terminal 56 is applied in a video amplifier 66 through a terminal 65. The broadcasting signal amplified by the amplifier 66 is supplied, through the switch 32 and a rotary transducer 67, to the rotary magnetic heads 16 and 17. The supplied signal is recorded on the magnetic tape 10 by the magnetic heads 16 and 17.

Figures 7, 9, 10:
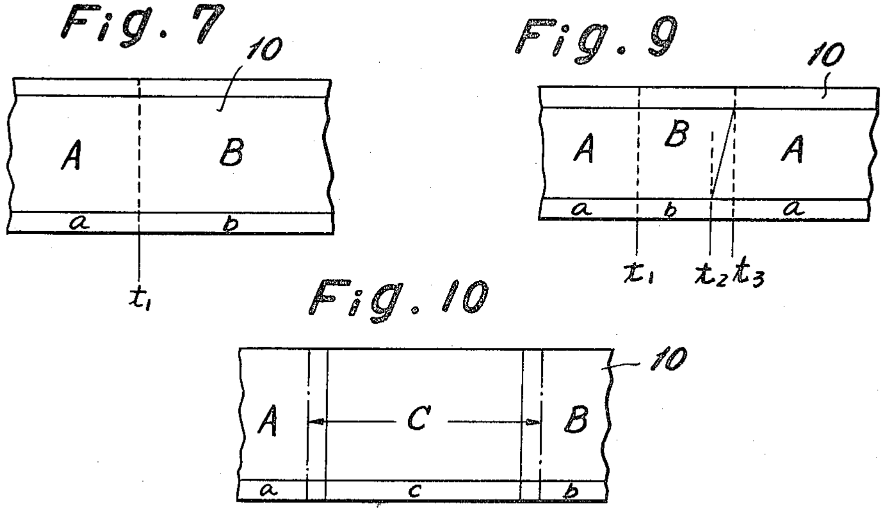
FIG. 7 is a graphical view showing a tape pattern of the tape edited by the system shown in FIG. 5.
FIG. 9 is a graphical view showing a tape pattern of the tape edited by the system shown in FIG. 8.
FIG. 10 is a graphical view showing another tape pattern of a tape having programs to be edited by the system shown in FIG. 8.

Therefore, as shown in FIG. 7, another new video signal B and a new control signal *b* are recorded on the magnetic tape 10 in the half-way of the already recorded video signal A and control signal *a* at a time point $t_1$ in the middle way of recording. At the time point $t_1$, as above mentioned, the phases of the control signals *a* and *b* coincide with each other and editing is coordinate with the previous signal. Accordingly, it is not probable that a synchronizing phase error would occur at the time point $t_1$ during reproduction. Since the relay 61 is in the operated position at this time, the movable contact member 62 and the fixed contact point 63 are opened to release the relay 50. Thus, the movable contact member 51 and the fixed contact point 52 are closed, and a resistor $R_{101}$ is shortcircuited at its opposite ends, whereby the capstan motor 55 can begin to rotate at the predetermined constant velocity again.

In this connection, caution should be taken not to reduce the rate of revolution of the capstan motor 55 too greatly. If the value of resistor $R_{101}$ were too large and consequently the velocity of revolution of the capstan motor 55 were reduced too much when the relay 50 is in an operated position, there would be too great a difference in the respective frequencies of the synchronizing signals of two video signals. Moreover, the inertia of the capstan motor 55 would cause an irregularity in the rate of revolution of the rotary magnetic head drive motor 25. Thus, the rotary magnetic head would become irregular immediately after a switching to the editing or the normal playback mode, and this would result in disturbance of the head servo system.

In this embodiment (FIG. 5), the resistor $R_{101}$ is used to reduce the rate of movement of the magnetic tape so as to delay the synchronizing signal in phase. However, it is to be understood that there may be an increase of the capacitance of a capacitor $C_{101}$ (FIG. 6) connected to an auxiliary winding of the capstan motor 55. For example, another capacitor may be connected in shunt to the capacitor $C_{101}$, by using the movable contact member 51 and the fixed contact point 52 of the relay 50. The rate of revolution of the capstan motor 55 may be increased by the added capacitance to thereby increase the rate of movement of the magnetic tape and advance the synchronizing signal in phase.

Figure 6:
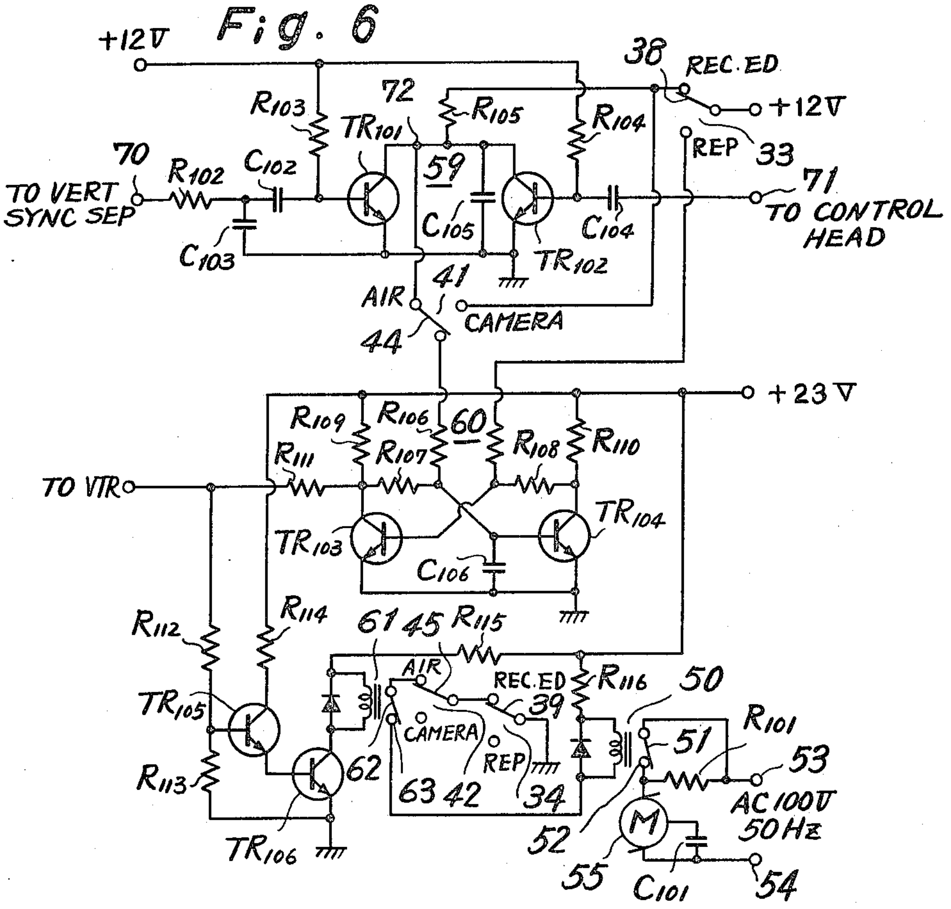
FIG. 6 is a schematic circuit diagram showing essential portions of the systematic block diagram shown in FIG. 5.

FIG. 6 is a schematic circuit diagram showing the essential portions of the embodiment shown in FIG. 5. In FIG. 6, the vertical synchronizing signal of the AIR signal is supplied through an input terminal 70. This signal is applied to the base of a transistor $TR_{101}$ via a resistor $R_{102}$, capacitor $C_{102}$, and to the emitter of transistor $TR_{101}$ via capacitor $C_{103}$. The reproduced control signal is supplied through another input terminal 91. This signal is applied to the base of a transistor $TR_{102}$ via a capacitor $C_{104}$. A bias voltage +12V is applied to the bases of these two transistors $TR_{101}$ and $TR_{102}$ through resistors $R_{103}$ and $R_{104}$ respectively. The transistors $TR_{101}$ and $TR_{102}$, a resistor $R_{105}$, and a capacitor $C_{105}$ make up the AND gate circuit 59 which makes an AND-gating of the vertical synchronizing signal and the reproduced control signal.

When the contact member 38 of the switch 33 is moved into contact with the contact point REC. ED thereof, in effecting recording by editing, a voltage of +12V will be applied to the collectors of the transistors $TR_{101}$ and $TR_{102}$. The output signal pulses will appear at the common junction point 72 between the collectors of the transistors $TR_{101}$ and $TR_{102}$. These pulses appear when the vertical synchronizing signal of the AIR signal and the reproduced control signal coincide with each other in phase. These output signal pulses are supplied, through the switch 41 and a resistor $R_{106}$, to the mode change-over switching circuit 60. The switching circuit 60 is made up of a pair of transistors $TR_{103}$ and $TR_{104}$, resistors $R_{107}$, $R_{108}$, $R_{109}$, $R_{110}$, and a capacitor $C_{106}$. A voltage of +23V is applied to the collector of transistor $TR_{103}$ through the resistor $R_{109}$ and to the transistor $TR_{104}$ through the resistor $R_{110}$.

Upon actuation of the mode change-over switching circuit 60, an output signal is generated by the circuit and transmitted through a resistor $R_{111}$ to the tape player VTR which is switched by the signal to a recording mode. The player then begins to record the AIR signal. At the same time, the output signal is applied through a resistor $R_{112}$ to the base of a transistor $TR_{105}$ which makes up an amplifier together with a transistor $TR_{106}$ and resistors $R_{113}$ and $R_{114}$, so that the signal is amplified. The amplified signal is introduced into the coil of the relay 61 which operates. Thereupon, the movable contact member 62 is moved away from the fixed contact point 63 to thereby release the relay 50. The contact member 51 then closes a circuit through the contact point 52. Thus, the resistor $R_{101}$ is shortcircuited on its opposite ends, and the capstan motor 55 rotates at the predetermined constant velocity of revolution. The capacitor $C_{101}$ is connected to the auxiliary winding of the capstan motor 55.

The constants of circuit elements of the circuits shown in FIG. 6 are as follows:

| | | |
|---|---|---|
| Resistor | $R_{101}$ | 82Ω (6W) |
| | $R_{102}$ | 10KΩ |
| | $R_{103}$ | 100KΩ |
| | $R_{104}$ | 100KΩ |
| | $R_{105}$ | 5.6KΩ |
| | $R_{106}$ | 5.6KΩ |
| | $R_{107}$ | 22KΩ |
| | $R_{108}$ | 22KΩ |
| | $R_{109}$ | 6.8KΩ |
| | $R_{110}$ | 6.8KΩ |
| | $R_{111}$ | 5.6KΩ |
| | $R_{112}$ | 10KΩ |
| | $R_{113}$ | 10KΩ |
| | $R_{114}$ | 6.8KΩ |
| | $R_{115}$ | 180Ω(2w) |
| | $R_{116}$ | 220Ω |

| | | |
|---|---|---|
| Capacitor | $C_{101}$ | 4μF |
| | $C_{102}$ | 1/15μF |
| | $C_{103}$ | 0.01μF |
| | $C_{104}$ | 0.01μF |
| | $C_{105}$ | 0.047μF |
| | $C_{106}$ | 1,000pF |

Another embodiment of the system according to the present invention will be illustrated with reference to FIG. 8. In FIGS. 6 and 8, the same reference characters are used to designate similar parts, and the detail description thereof if omitted. Prior to starting of the editing, movable contact members 83, 84, 85, 36, 37, 38 and 39 of change-over switches 80, 81, 82, 31, 32, 33 and 34 are respectively contacted the fixed contacts *p*.

The control signal track on the magnetic tape 10 is scanned by the first control head 12 and the second control head 46 of the magnetic head block 21. The control head 12 is actuated only for the reproduction and the control head 46 solely for the recording. The control signal reproduced by the first control head 12 is supplied to the phase comparator 47 after passing through the switches 81 and 80. As in the first embodiment illustrated with reference to FIG. 5, the head motor 25 is controlled by the open loop servo system consisting of the phase comparator 47, the 30 Hz oscillator 48 and the motor drive amplifier 49. The rotary magnetic head 18 is rotated at a predetermined rate of 30 revolutions per second.

As the contact member 39 of the switch 34 is switched to connect a power source of voltage $+B_2$ to the contact point *p*, the relay 50 is not energized by a voltage. Thus, the relay 50 is in the non-operative state. Accordingly, the contact member 51 and the contact point 52 of the relay 50 are closed, whereby the AC voltage (AC 100 V, 50 Hz) fed through the power source terminals 53 and 54 is supplied directly to the capstan motor 55. The motor 55 drives the capstan 22. The capstan motor 55 rotates at a constant rate to thereby transport the magnetic tape 10 at a predetermined velocity.

When editing is started, an editing start button 86 is depressed so as to close an editing start switch 87. When the switch 87 is closed, a relay 88 is energized from a +B power source applied through the switch 87 and a terminal 89. Then the relay 88 operates. By the operation of the relay 88, the movable contact members 38 and 39 of the relay switches 33 and 34 are changed to the contact points *q*. At this instant, the contact members of the switches 80, 81, 82, 31 and 32 are stayed from being connected to the contact points *p*.

The video signal to be edited and recorded is supplied through the input terminal 56 to the vertical synchronizing signal separator 57. The input video signal may be a broadcast receiving signal or a signal from a television camera. The vertical synchronizing signal separated from the input signal by the separator 57 is supplied to the AND gate circuit 59. Simultaneously, on the other hand, the control signal reproduced by the first control head 12 is supplied through a line 90 to the AND gate circuit 59. The AND gate circuit 59 generates no output if the phases of the synchronizing signal and the reproduced control signal are not in coincidence. An output signal pulse is generated from the AND gate circuit 59 only when the phases of both signals coincide.

When the synchronizing signal of the video signal to be recorded and the control signal already recorded on the magnetic tape 10 are different in phase, the output is not produced from the AND gate circuit 59. Accordingly, at this instant, the mode change-over swithing circuit 60 is not actuated and thereby the relay 61 is in the released state. Here, the normally closed relay contact member 62 of the relay 61 is in contact with the contact point 63 to be closed. Therefore, if the contact member 39 of the switch 34 is switched to the contact point *q*, a voltage $+B_2$ is supplied to the relay 50 through the switch 34, the contact member 62 and the contact point 63. Then, the relay 50 is operated and thereupon the normally closed relay contact member 51 moves apart from the contact point 52 to open a circuit. The resistor $R_{101}$ is then connected serially with the capstan motor 55. The voltage AC 100 V applied between the terminals 53 and 54 is applied through the resistor $R_{101}$ to the capstan motor 55. Therefore, the capstan motor 55 is rotated at a lower velocity than the predetermined rate of the normal reproducing mode. The travelling velocity of the magnetic tape 10 is thus reduced and the phase of the reproduced control signal is varied and shifted.

Upon the slowing of the travelling velocity of the magnetic tape 10, the phase of the control signal reproduced from the magnetic tape 10 is delayed. The AND gate circuit 59 produces an output when there is a coincidence between the control signal which is reproduced by the control head 12 and the synchronizing signal of the video signal which is supplied from the circuit 57. As the mode change-over switching circuit 60 is actuated by an output signal pulse of the circuit 59, the relay 61 is then actuated in similar manner, as in the above embodiment. The relay contact member 62 opens when the relay 50 releases, and the relay contact member 51 is in turn closed. Thus, both ends of the resistor $R_{101}$ are shortcircuited, and the capstan motor 55 rotates again at a constant normal velocity.

By actuation of the mode change-over switching circuit 60, the contact members 83, 84, 85, 36 and 37 of the switches 80, 81, 82, 31 and 32 are switched simultaneously to the contact points *q*. As the switch 82 is changed over, a voltage $+B_3$ is supplied in the amplifier 94, via a terminal 91 and switches 82 and 92. The full erase head 14 is supplied a high frequency erasing current. Thus the erase head 14 erases the previously recorded signal over the entire width of the magnetic tape 10. Since the switch 32 has been changed, the video signal applied via the terminal 65 is supplied to the magnetic heads 16 and 17. The supplied video signal is recorded by the magnetic heads 16 and 17 on the magnetic tape 10 which has been erased prior to recording. When the switch 31 is changed over, the output signal of the ½ frequency divider 58 is recorded on the magnetic tape 10 as a control signal by the second control head 46. Hence, the editing and recording operation is performed. Also by change-over operation of the switches 80 and 81, the head motor 25 is energized by an output signal of the ½ frequency divider 58, supplied through the switch 80 and is driven by this signal.

After editing has been started, the button 86 is released. The switch 87 is then opened and the relay 88 releases. The contact members 38 and 39 of the switches 33 and 34 are switched to the contact point *p*. The AND gate circuit 59 does not receive the voltage $+B_1$ so that it releases. Even though the AND gate circuit 59 receives a synchronizing signal and a reproducing control signal which are coincident in phase, the circuit 59 does not generate its output signal. At the same time, the relay 61 releases, and the contact members 62 is closed to the contact point 63.

At the time point $t_1$ when the editing starts, as shown in FIG. 9, the travelling velocity of the magnetic tape 10 is controlled as hereinbefore described. There, the previously recorded video signal A and the 30 Hz control signal *a* coincide in phase with the editing and recording video signal B and 30 Hz control signal *b*. Thus, beginning at the time point $t_1$, the editing and recording of the new video signal B and control signal *b* is applied to the tape.

The operation at the end of editing will now be described. Magnetic heads 16 and 17 record the video signal, as described above, on the track oblique to the longitudinal direction of the magnetic tape. Assume that erasing would be performed by the erase magnetic head 14 substantially to a time point $t_3$ (FIG. 9) then, an unrecorded portion of a triangular shape may be formed between the time points $t_2$ and $t_3$. If a new signal is further doubly recorded on the previously recorded signal, the already recorded signal is erased in some extent by the new signal. The new signal is recorded thereon, since the recorded video signal has been modulated of its frequency. Here, a generation of double recorded portions may be more desirable than producing unrecorded portions. Therefore, in order to end completely the editing and recording at the time point $t_3$, it is necessary to stop the erasing of the erase magnetic head 14 at the time point $t_2$ preceding the time point $t_3$, as shown in FIG. 9.

At the end of edit and recording, an editing ending button 95 should be depressed at the time point $t_2$ so as to close an edit ending switch 96. As a result of closing the switch 96, a relay 97 is energized from the +B power source through the switch 96 and the terminal 89. The operation of the relay 97 switches the contact member 93 of the switch 92 to a dead contact point *q*. The switch 92 is then opened. By opening the switch 92, the erase magnetic head 14 is put in its non-operative state, and it stops its erasing operation. Therefore, the previously recorded signal on the magnetic tape 10 is not erased thereafter.

When the relay 97 is actuated, a contact member 99 of a switch 98 is thereby switched from a dead contact point *p* to a contact point *q*. Due to the closing of the switch 98, a delay relay 100 is closed to the +B power source through the switch 98 and a terminal 101. The delay relay 100 has a delay time of $(t_3 - t_2)$ in its operation. After the button 95 is depressed at the time point $t_2$, the erase magnetic head 14 is stopped in its erasing operation. The delay relay 100 operates at the time point $t_3$. At this moment, a double recording is effected for the interval between the time points $t_2$ to $t_3$, the double recording occuring in a triangular portion on the magnetic tape 10, where a new signal is recorded on the already recorded signal.

A contact member 103 of a switch 102 is switched by operation of the delay relay 100 from a dead contact point *p* to an active contact point *q*. This switching is performed at the time point $t_3$. As the switch 102 is closed, the relay 88 is to energized from the +B power source through the switch 102 and a terminal 104. When the relay 88 is again operated, the contact members 38 and 39 of the switches 33 and 34 are changed from the contact points *p* to the contact points *q* somewhat as at the starting time of the editing and recording as heretofore described. Thereafter, the same operation is resumed as at the moment when editing and recording were started.

When the contact members 39 of the switch 34 is changed to the contact point *q*, the relay 50 is actuated to open the contact member 51. Hence, the rotation velocity of the motor 55 is slowed down. On the other hand, when the contact member 38 of the switch 33 is changed to the contact point *q*, the AND gate circuit 59 is supplied with a voltage $+B_1$, and it becomes operative. Since the first control head 12 is located closer to the tape supply side than the erase head 14, it can always reproduce a signal before it is erased by the erase magnetic head 14. Even though the switches 80, 81, 82, 31 and 32 are in the recording mode, the signal reproduced by the control head 12 is always fed to the AND gate circuit 59 through the line 90.

The AND gate circuit 59, after being supplied with the voltage +B and made operative, generates the output signal. This AND gate signal occurs when the synchronizing signal from the vertical synchronizing signal separator 57 and the control signal reproduced by the control head 12 coincide in phase. The mode change-over switching circuit 60 receives the signal from the AND gate circuit 59 and reverses its mode. Then, the contact members 83, 84, 85, 36 and 37 of the switches 80, 81, 82, 31 and 32 are switched from the contacts *q* to the contacts *p*, and the recording mode is returned again to the reproducing mode. Thereby, the editing and recording of the new video signal B and the new control signal *b* is completed.

In the above described embodiments, the video signal A and the control signal *a* have been already recorded continuously on the magnetic tape 10. On this magnetic tape, the new video signal B and new control signal *b* which are different in phases from the signals A and *a* are edited and recorded in the middle way of the signals A and *a*. However, the system according to the present invention will not be confined solely to the manner of editing and recording, as described in the above embodiments. For example, as shown in FIG. 10, it can be enabled to edit and record a new video signal C and a new control signal *c* between the video signal A, control signal *a* and the video signal B, control signal *b*. As described, the video signal C and control signal *c* may be different in phases respectively from the video signals A, B and the control signals *a*, *b* which have been all already recorded on the magnetic tape 10.

Further, in the second embodiment, the switches connected to point 89 are described as being manually operated. These switch, however, can be automatically operated in association with the operation of the switching circuit 60 as the case may require.

Other preferred variations and modifications may be practiced, and the claims should be construed to cover all equivalent structures which will not depart from the scope and spirit of the invention.

What I claim is:

1. A signal editing system for a magnetic recording and reproducing apparatus which comprises means including at least one rotary magnetic head for recording a video signal on and reproducing said video signal from one portion of a magnetic tape, said video signal including at least a vertical synchronizing signal, means responsive to the vertical synchronizing signal for producing a control signal, means comprising a fixed magnetic head for recording said control signal on and reproducing said control signal from another portion of the magnetic tape, means responsive to said control signal for rotating the rotary magnetic head in synchronism with the control signal during operation of the apparatus in a recording mode, means responsive to the control signal reproduced by said fixed magnetic head from said other portion of the magnetic tape for rotating the rotary magnetic head in synchronism with the reproduced control signal during operation of the apparatus in a reproducing mode, means comprising a motor for moving the magnetic tape at a predetermined velocity responsive to a current flowing from a power supply through said motor; separator means for separating a vertical synchronizing signal from a video signal, means for supplying a second video signal to the separator means to be edited and recorded on the magnetic tape to produce a second vertical synchronizing signal, and combination means operative when the second video signal is supplied to the separator means, said combination means including means responsive to the supply of the second video signal to said separator means for inserting an impedance element between said motor and said power supply, whereby current flowing through the motor is controlled to change the velocity of the magnetic tape from the predetermined velocity, detector means responsive only to said second vertical synchronizing signal coinciding in time with the control signal reproduced by the fixed magnetic head for combining said second vertical synchronizing signal with the control signal reproduced by the fixed magnetic head and generating an output signal, means responsive to the generation of the output signal from said detector means for making said impedance element inactive, means responsive to the generation of the output signal from said detector means for recording said second video signal on said one portion of the magnetic tape, and means responsive to the generation of the output signal from said detector means for recording a second control signal on said other portion of the magnetic tape, said second control signal being produced from the second vertical synchronizing signal by the control signal producing means.

2. A signal editing system for a magnetic recording and reproducing apparatus which comprises a supply reel for supplying a magnetic tape, means comprising at least one rotary magnetic head for recording a video signal on and reproducing said video signal from one portion of the magnetic tape, said video signal having at least a vertical synchronizing signal, a take-up reel for taking up the magnetic tape, means for producing a control signal from the vertical synchronizing signal, a first fixed magnetic head disposed between said rotary magnetic head and said take-up reel for recording said control signal on another portion of the magnetic tape, means responsive to said control signal for rotating the rotary magnetic head in synchronism with the control signal during operation of the apparatus in a recording mode, a second fixed magnetic head disposed between said supply reel and said rotary magnetic head for reproducing the control signal from said other portion of the magnetic tape, means responsive to the control signal reproduced by the second fixed magnetic head for rotating the rotary magnetic head in synchronism with the reproduced control signal during operation of the apparatus in a reproducing mode, means comprising a motor for moving the magnetic tape at a predetermined velocity responsive to a current flowing from a power supply through said motor, separator means for separating a vertical synchronizing signal from a video signal, means for supplying a second video signal to the separator means to be edited and recorded on the magnetic tape to produce a second vertical synchronizing signal, combination means operative when the second video signal is supplied to the separator means, said combining means including means responsive to the supply of the second video signal to said separator means for inserting an impedance element between said motor and said power supply, whereby current flowing through the motor is controlled to change the velocity of the magnetic tape from the predetermined velocity, means including an AND gate circuit responsive only to a coincidence of said second vertical synchronizing signal and the reproduced control signal for combining said second vertical synchronizing signal with the control signal reproduced by the second fixed magnetic head and for generating an output signal, means responsive to the generation of the output signal from the AND gate circuit means for making said impedance element inactive, means responsive to the generation of the output signal from the AND gate circuit means for recording said second video signal on said one portion of the magnetic tape, and means responsive to the generation of the output signal from the AND gate circuit means for recording a second control signal on said other portion of the magnetic tape by the first fixed magnetic head, said second control signal being produced from the second vertical synchronizing signal by the control signal producing means.

3. The signal editing system for a magnetic recording and reproducing apparatus of claim 2 which further comprises an erasing means disposed between said first and second magnetic heads, means for stopping the operation of said erasing means immediately before said editing is ended, and means for ending the editing operation of the recording means with a predetermined delay time after the stopping of the operation of said erasing means.

* * * * *